US008300606B2

(12) United States Patent
Michel et al.

(10) Patent No.: US 8,300,606 B2
(45) Date of Patent: Oct. 30, 2012

(54) METHOD AND TELECOMMUNICATION DEVICE FOR SELECTING NUMBER OF CODE CHANNELS AND ASSOCIATED SPREADING FACTOR FOR CDMA TRANSMISSION

(75) Inventors: Jürgen Michel, München (DE); Bernhard Raaf, Neuried (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 1186 days.

(21) Appl. No.: 12/084,250

(22) PCT Filed: Oct. 23, 2006

(86) PCT No.: PCT/EP2006/067658
§ 371 (c)(1),
(2), (4) Date: Apr. 28, 2008

(87) PCT Pub. No.: WO2007/048768
PCT Pub. Date: May 3, 2007

(65) Prior Publication Data
US 2009/0135786 A1    May 28, 2009

(30) Foreign Application Priority Data
Oct. 28, 2005  (EP) .................................. 05023669

(51) Int. Cl.
*H04B 7/216* (2006.01)
(52) U.S. Cl. ........................ 370/335; 370/329
(58) Field of Classification Search ................ 370/335, 370/329
See application file for complete search history.

(56) References Cited

U.S. PATENT DOCUMENTS

| | | |
|---|---|---|
| 2001/0026543 A1 | 10/2001 | Hwang et al. |
| 2005/0157687 A1* | 7/2005 | Heo et al. ........................ 370/335 |
| 2005/0185594 A1* | 8/2005 | Horneman et al. ............ 370/252 |
| 2005/0185744 A1* | 8/2005 | Sato .............................. 375/354 |

FOREIGN PATENT DOCUMENTS

| | | |
|---|---|---|
| EP | 1 780 901 A1 | 5/2007 |
| JP | 2000-209185 | 7/2000 |
| JP | 2003-304218 | 10/2003 |

(Continued)

OTHER PUBLICATIONS

"Universal Mobile Telecommunication System (UMTS); Multiplexing and channel coding (FDD)"; 3GPP TS 25.212 version 6.6.0 Rrelease 6, ETSI TS 125 212 V 6.6.0, Sep. 2005; pp. 67-68.

(Continued)

*Primary Examiner* — Gary Mui
*Assistant Examiner* — Farhad Ali
(74) *Attorney, Agent, or Firm* — Staas & Halsey LLP

(57) ABSTRACT

A set of permissible parameter pairs with the parameters being a number of code channels and an associated spreading factor is determined according to at least one first selection criterion. Then a parameter pair from the set of permissible parameter pairs for the CDMA transmission is selected according to at least one second selection criterion. In this selection process, the spreading factor is used as a second selection criterion with a higher value being preferred over a lower value if both spreading factors are below or equal to a threshold spreading factor value. This accounts for the fact that in a certain regime low spreading factor involve a prohibitively high processing load and lead to increase inter symbol interference.

6 Claims, 1 Drawing Sheet

FOREIGN PATENT DOCUMENTS

| | | |
|---|---|---|
| JP | 2005-20690 | 1/2005 |
| RU | 2 104 615 C1 | 2/1998 |
| WO | 00/54443 | 9/2000 |
| WO | 2004/098092 A1 | 11/2004 |

OTHER PUBLICATIONS

"Determination of SF and number of PhCHJs needed"; Tdoc R1-050434; 3GPP TSG-RAN WG1 Meeting #41, May 2005, printed from www.3gpp.org/ftp/TSG_RAN/TSG_RAN/TSGR_28/Docs/PDF/RP-050252.pdf on Apr. 28, 2008.

Change Request 25.212 Version 6.4.0; Tdoc R1-050434; 3GPP TSG-RAN WG1 Meeting #41; Athens, Greece, May 2005; 3 pp.

Universal Mobile Telecommunication System (UMTS); Multiplexing and Channel Coding (FDD) (3GPP TS 25.212, Release 6); ETSI TS 125 212 V.6.6.0; Sep. 2005; pp. 1-85.

European Search Report for Application No. EP 05 02 3669; mailed Mar. 13, 2006.

International Search Report for Application No. PCT/EP2006/067658; mailed Mar. 6, 2008.

3rd Generation Partnership Project; Technical Specification Group Radio Access Network; UE Radio Access capabilities (Release 6); TS 25.306 V6.6.0; 2005; pp. 1-34.

\* cited by examiner

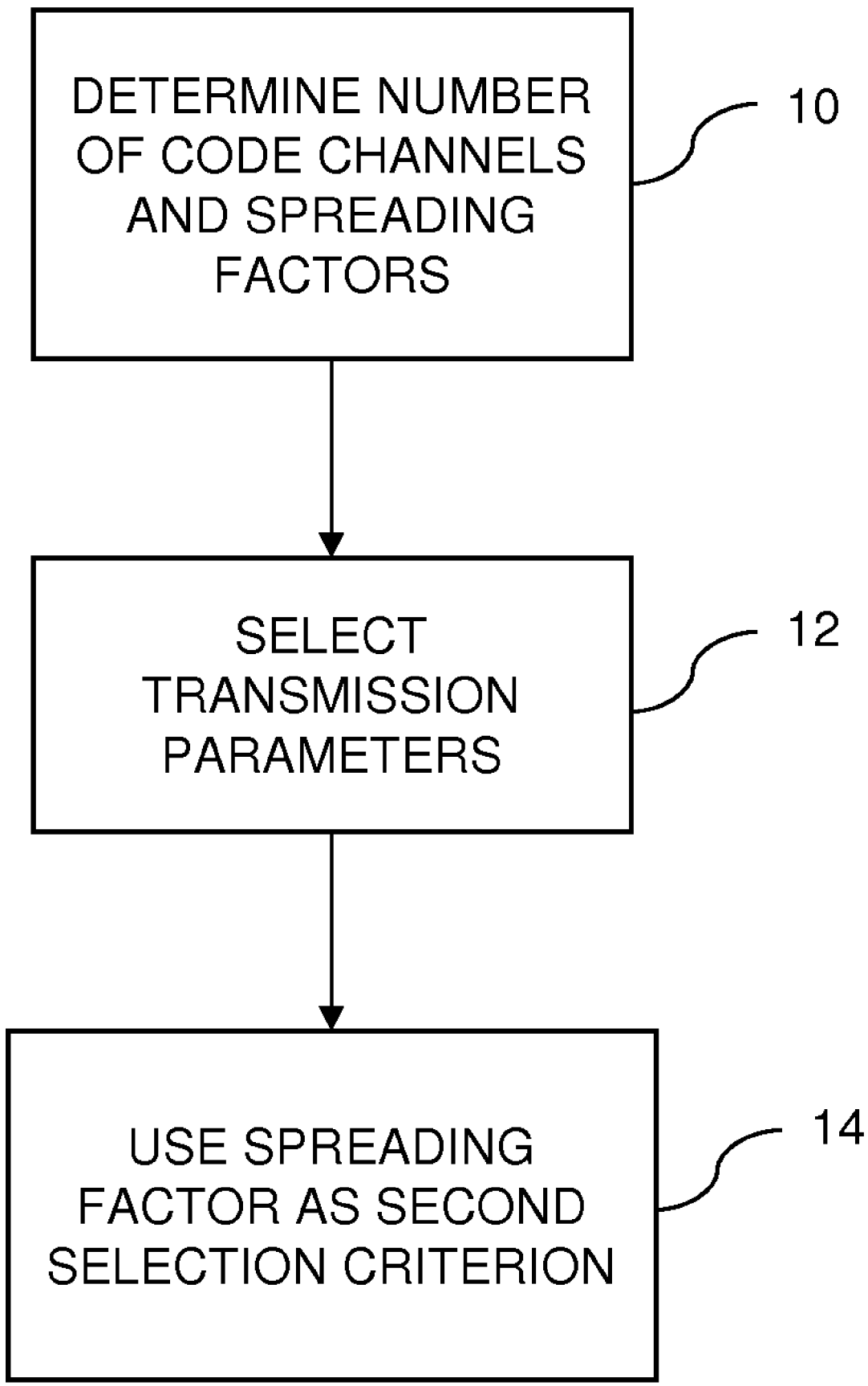

METHOD AND TELECOMMUNICATION DEVICE FOR SELECTING NUMBER OF CODE CHANNELS AND ASSOCIATED SPREADING FACTOR FOR CDMA TRANSMISSION

CROSS REFERENCE TO RELATED APPLICATIONS

This application is based on and hereby claims priority to European Application No. 05023669 filed on Oct. 28, 2005, the contents of which are hereby incorporated by reference.

BACKGROUND

Described below is a method and a telecommunication device for selecting a number of code channels and an associated spreading factor for a CDMA transmission between a sending and a receiving device in the field of mobile telecommunications. More specifically, the determination of parameters for a CDMA (code division multiple access) transmission is targeted.

Wireless transmission relies on a transmission medium with resource limitations. The available bandwidth has to be allocated in an efficient way to allow for many-user transmission services. More conventional ways for resource allocation are based on the division by frequency (FDMA: frequency division multiple access) or division by time (TDMA: time division multiple access). GSM (Global System for Mobile communications) avails of these technologies. A novel approach is provided by CDMA (Code Division Multiple Access). Instead of dividing the allowed frequency range into a few hundred narrow channels, CDMA usually allows each station to transmit over the entire frequency spectrum all the time. Multiple simultaneous transmissions are separated using coding theory. In CDMA, each bit time is subdivided into short intervals called chips. Each station is assigned a unique code called chip sequence. To transmit a 1 bit, a station sends its chip sequence. To transmit a 0 bit, it sends the one's complement of its chip sequence. All chip sequences are pairwise orthogonal, so that the signal of a given sender can be extracted via the inner product of the received signal with the sending station's chip sequence. Thus, each station can use the full spectrum.

CDMA requires selecting transmission parameters (spreading factor) and used physical resources (number of time multiplexed parallel code channels) in a CDMA telecommunication device. After rate matching the coded information bits are mapped to the available physical resources in such way that PAPR (Peek-to-Average Power Ratio) is kept low by limiting the number of parallel code channels (avoiding of multi-code). In addition, the degradation by the influence of inter symbol interference is kept low by avoiding the usage of the lowest spreading factor unless a critical puncturing ratio is exceeded for higher spreading factors. Thereby, the spreading factor usually id defined as the ration between chip rate and data rate, or, equivalently, as the ratio of the information bit duration over the chip duration.

In communication systems physical resources and transmission parameters are often determined depending on the number of information bits after coding and the available physical resources which can depend on the capability of the telecommunication device. One example of such a transmission system is the so called E-DCH (Enhanced Dedicated Channel) scheme which is an enhancement of UMTS (Universal Mobile Telecommunication System).

The outlines of the E-DCH standard can be found in the 3GPP RAN Specifications and the scheme for selecting the physical layer resources is described in the Specification TS 25.212 V6.6.0 in Chapter 4.8.4.1 "Determination of SF and number of PhCHs needed". This specification explicitly sets out how to determine or select a number of code channels and an associated spreading factor for a CDMA transmission from those supported by the hardware. Selection criteria are the necessary amount of puncturing and the number of code channels. Puncturing, a procedure used to combine the power-control bits and the binary voice symbols on traffic channels, means to discard voice symbols in favour of inserted power-control bits. Obviously, too much puncturing will lead to a degradation of the voice signal. As a rule, puncturing increases with the spreading factor. In determining a number of code channels and an associated spreading factor one principally proceed as follows. There are limits to the maximum amount of puncturing. These limits will define an allowable puncturing range corresponding to numbers of code channels and associated spreading factors. This range may also be limited in view of necessary repetitions of information bits. As a further criterion one uses the number of code channels, which should be as low as possible. Last, among those pairs of code channel and associated spreading factor left (which will only differ with respect to the spreading factor) one chooses the pair with the smallest spreading factor so as to decrease the amount of puncturing as much as possible.

SUMMARY

An aspect is to present an improved selection of a number of code channels and an associated spreading factor for a CDMA transmission.

The method relies on the observation that there are disadvantages in selecting spreading factors at the low end. The selection of small spreading factors, such as 2×SF2 (two code channels with spreading factor two), lead to an increased number of bits and hence to a higher processing load in the receiver. In addition, the symbol interference increases. For small spreading factors these caveats outweigh the benefit of a lower puncturing. The additional processing load is particularly pronounced for low spreading factors. For instance, a selection of 2×SF2 instead of 4×SF2 (the next higher spreading factor) essentially doubles the load. On the contrary, for higher spreading factors the effect decreases and the amount of puncturing is the major concern. Accordingly, it is suggested to proceed in the following way to select a number of code channels and an associated spreading factor for a CDMA transmission between a sending and a receiving device.

A set of permissible pairs of the parameters number of code channels and associated spreading factor is determined according to at least one first selection criterion. Such a first selection may be given by a limitation of the sending or the receiving device (e.g. hardware limitation), a rate matching criterion (e.g. the rate matching ratio) or a limit for the amount of puncturing necessary to keep the degradation induced by puncturing within bounds.

Among the permissible parameter pairs for the CDMA transmission a parameter pair according to at least one second selection criterion is selected. For this selection the spreading factor is used as a second selection criterion. In this selection, a higher spreading factor or spreading factor value is preferred over a lower value if both spreading factors are below or equal to a threshold spreading factor value. The threshold spreading factor can be determined or chosen by accounting for the trade-off between the effect of higher processing load and more symbol interference on the one hand and more puncturing on the other hand. A possible threshold value is a spreading factor of four.

According to an embodiment, a lower value of the spreading factor is preferred over a higher value if both spreading factors are above or equal to the threshold spreading factor value. That a balance between the above influencing factors is achieved leading to an optimal selection of parameters.

The above selection criteria may be combined with the number of code channels as an additional criterion. So, the number of code channels may be used as a second selection criterion with a lower value being preferred over a higher value or with a value of one being preferred over a higher value. In view of the importance to reduce the number of channels this number may be used as a primary selection criterion with respect to the spreading factor value, i.e. the spreading factor value is used only after selecting according to the number of channels.

The method may be implemented using a telecommunication device (e.g. a base station or a mobile terminal) with means for performing the selection of a number of code channels and an associated spreading factor. These means may comprise hardware, software and firmware. The telecommunication device may be a transmission or a reception device.

BRIEF DESCRIPTION OF THE DRAWINGS

These and other aspects and advantages will become more apparent and more readily appreciated from the following description of the exemplary embodiments, taken in conjunction with the accompanying drawings of which:

FIG. 1 is a flowchart of a method according to an embodiment.

DETAILED DESCRIPTION OF THE PREFERRED EMBODIMENT

Reference will now be made in detail to exemplary embodiments, wherein like reference numerals refer to like elements throughout.

The outlines of the E-DCH standard can be found in the 3GPP RAN Specifications and the scheme for selecting the physical layer resources is described in the Specification TS 25.212 V6.6.0 in Chapter 4.8.4.1 "Determination of SF and number of PhCHs needed". This chapter is cited here:
Start of Citation - - -
4.8.4.1 Determination of SF and Number of PhCHs Needed
The maximum amount of puncturing that can be applied is
   1-$PL_{non-max}$ if the number of code channels is less than the maximum allowed by the UE capability and restrictions imposed by UTRAN.
   1-$PL_{max}$ if the number of code channels equals to the maximum allowed by the UE capability and restrictions imposed by UTRAN.
The number of available bits per TTI of one E-DPDCH for all possible spreading factors is denoted by $N_{256}$, $N_{128}$, $N_{64}$, $N_{32}$, $N_{16}$, $N_8$, $N_4$ and $N_2$, where the index refers to the spreading factor.
The possible number of bits available to the CCTrCH of E-DCH type on all PhCHs, $N_{e,data}$, then are $\{N_{256}, N_{128}, N_{64}, N_{32}, N_{16}, N_8, N_4, 2 \times N_4, 2 \times N_2, 2 \times N_2 + 2 \times N_4\}$.
SET0 denotes the set of $N_{e,data}$ values allowed by the UTRAN and supported by the UE, as part of the UE's capability. SET0 can be a subset of $\{N_{256}, N_{128}, N_{64}, N_{32}, N_{16}, N_8, N_4, 2 \times N_4, 2 \times N_2, 2 \times N_2 + 2 \times N_4\}$.

The total number of bits in a TTI before rate matching with transport format j is $N_{e,j}$. The total number of bits available for the E-DCH transmission per TTI with transport format j, $N_{e,data,j}$, is determined by executing the following algorithm, where $PL_{non-max}$ is signalled from higher layers and $PL_{max}$ is equal to 0.44 for all E-DCH UE categories defined in [15] except the highest E-DCH UE category, for which $PL_{max}$ is equal to 0.33:

---

SET1 = { $N_{e,data}$ in SET0 such that $N_{e,data} - N_{e,j}$ is non negative }
If SET1 is not empty and the smallest element of SET1 requires just one
   E-DPDCH then $N_{e,data,j}$ = min SET1
Else
   SET2 = { $N_{e,data}$ in SET0 such that $N_{e,data} - PL_{non-max} \times N_{e,j}$ is
   non negative }
   If SET2 is not empty then
      Sort SET2 in ascending order
      $N_{e,data}$ = min SET2
      While $N_{e,data} - N_{e,j}$ is negative and $N_{e,data}$ is not the max of
         SET2 and the follower of $N_{e,data}$ requires no additional
         E-DPDCH do
         $N_{e,data}$ = follower of $N_{e,data}$ in SET2
      End while
      $N_{e,data,j} = N_{e,data}$
   Else
      $N_{e,data,j}$ = max SET0 provided that $N_{e,data,j} - PL_{max} \times N_{e,j}$ is
      non negative
   End if
End if

---

While E-DCH TTI length is 10 ms, if an initial transmission occurs in a compressed frame, a retransmission occurs in a compressed frame or a retransmission occurs in a non-compressed frame and the initial transmission was compressed, the number of available bits per TTI of one E-DPDCH for all possible spreading factors denoted by $N_{256}$, $N_{128}$, $N_{64}$, $N_{32}$, $N_{16}$, $N_8$, $N_4$ and $N_2$ used in the algorithm above is replaced by $k \times N_{256}$, $k \times N_{128}$, $k \times N_{64}$, $k \times N_{32}$, $k \times N_8$, $k \times N_4$ and $k \times N_2$. The parameter k is equal to $n_{tx1}/15$ and $n_{tx1}$ is defined in 4.4.5.1.
End of Citation - - -

This scheme is designed to determine the number of code channels and their spreading factors 10 (FIG. 1) depending on the number of coded information bits and the capabilities of the transmitting telecommunication device. Also by determining the spreading factor(s) and the number of code channels the rate matching ratio is fixed. The rate matching ratio determines the amount of bits that are repeated or punctured (i.e. removed) from the stream of information bits after encoding to ensure that they fit onto the code channel(s).

Within this scheme to make sure that the number of parallel code channels is kept low but a specific amount of puncturing is not exceeded two puncturing limits called 1-PL_non_max and 1-PL_max are used. 1-PL_non_max is used if the number of code channels is less than the maximum allowed by the UE capability and restrictions imposed by the receiving telecommunication device. 1-PL_max is used if the number of code channels equals to the maximum allowed by the UE capability and restrictions imposed by the network. 1-PL_non_max can be set and signaled by the receiving telecommunication device and 1-PL_max is 0.56 for all E-DCH UE categories which can be found in the 3GPP Specification TS 25.306 except the highest E-DCH UE category for which 1-PL_max is 0.67. Other specific parameter choices of this and other parameters are possible.

The number of available data bits per transmission unit (e.g. TTI, Transmission Time Interval) of one E-DCH code channel (E-DPDCH) for all possible spreading factors is denoted by N256, N128, N64, N32, N16, N8, N4 and N2, where the index refers to the spreading factor. The set of possible number of data bits available to the complete transmission which can apply multiple code channels, Ne,data, then is {N256, N128, N64, N32, N16, N8, N4, 2×N4, 2×N2, 2×N2+2×N4}.

SET0 denotes the set of Ne,data values allowed by the receiving telecommunication device (e.g. NodeB) and supported by the transmitting telecommunication device (e.g. UE), as part of the transmitting telecommunication device capability. SET0 can be a subset of {N256, N128, N64, N32, N16, N8, N4, 2×N4, 2×N2, 2×N2+2×N4}. The total number of bits per transmission unit after channel coding and before rate matching is Ne,j. Ne,data,j is the total number of bits available for the E-DCH transmission per transmission unit.

To select the transmission parameters 12 (FIG. 1) and physical resources under the constraints described above the following rule can be utilized:

---

SET1 = { Ne,data in SET0 such that Ne,data − Ne,j is non negative }
If SET1 not empty and SET1 smallest element needs just one E-DPDCH
    then Ne,data,j = min SET1
Else
    SET2 = { Ne,data in SET0 such that Ne,data − PL_non_max × Ne,j non negative }
    If SET2 is not empty then
        Sort SET2 in ascending order
        Ne,data = min SET2
        While Ne,data − Ne,j is negative and Ne,data not max of SET2 and follower of Ne,data requires no additional E-DPDCH do
            Ne,data = follower of Ne,data in SET2
        End while
    Ne,data,j = Ne,data
    Else
        Ne,data,j = max SET0 provided that Ne,data,j − PL_max × Ne,j non negative
    End if
End if

---

However it is a in the current practice that if 2×SF2 usage is allowed in SET0 the transmitting telecommunication device does not select 2×SF4 if using that would require any puncturing. Instead 2×SF2 is selected even with repetition. If 1-PL_non_max is greater or equal than 0.5 then 2×SF4 is never used and the selection of physical resources is done discontinuously. Note that SFy denotes the spreading factor y e.g. SF4 denotes spreading factor 4, 2×SF4 means usage of two code channels (or shortly expressed as codes) with spreading factor 4 each, 2×SF2 means usage of two codes with spreading factor 2 each, 2×SF2+2×SF4 means usage of two codes with spreading factor 2 each plus two codes with spreading factor 4 each. This corresponds to the numbers N4, 2×N4, 2×N2, 2×N2+2×N4 respectively.

Hence an improved selection for the transmission parameters and physical resources is proposed.

In addition the usage of SF2 should be avoided. Currently, SF2 is not particularly avoided in the combination 2×SF2 and does not prioritize 2×SF4 instead. The current practice involves some limitations of using two spreading factors at the same time. This is also called "multicode" because multiple spreading sequences, sometimes called multiple codes are used. The more codes are used the higher the so called peak to average ratio becomes. This means, that the peak power of the transmitter must become higher at the same average power. This is caused by the fact, that multiple codes can ad up constructively or destructively, causing a higher variation than less codes. Therefore, from the point of view of the related art there is no difference between 2×SF2 and 2×SF4 because two spreading factors are used in both cases. Obviously a transmitter that is able to transmit at higher peak power is more complex and consequently more difficult to realize.

However, in fact there are differences that should be taken into account: With 2×SF2 twice as much bit Ne,data,j are carried than with 2×SF4, so the processing load in the receiver (at least for some part of the processing) is doubled. While this is true for every step in the succession of selectable N (selected number of code channels and their SF), except the last, in the considered case Ne,data,j is already quite large (2×SF2 is the second largest allocation, 2×SF2+2×SF4 is only 50% larger). Therefore the absolute step is the highest step size in the succession (even the step to 2×SF2+2×SF4 is not larger but of equal size). If this step can be avoided, this will have more impact on the receiver, than if another step is avoided. This allows dimensioning the receiver hardware more economically. As the receiver is often a base station, the more economical resource usage in the base station will either allow a cheaper base station design or more powerful base stations i.e. base stations that can process more traffic.

Another disadvantage of using SF2 is that it provides worse inter symbol and inter code interference properties due to the lower processing gain. Therefore typically the performance of SF2 is reduced in comparison with SF4. While this is true for any change in spreading factors, the effect is most noticeable for the lowest spreading factor, i.e. for SF2.

Hence, selection of the transmission parameters and physical resources is provided to avoid SF2 or more specifically the disadvantages mentioned above by the following modification of the above mentioned algorithm:

---

The lines
    While Ne,data − Ne,j is negative and Ne,data not max of SET2 and follower of Ne,data requires no additional E-DPDCH do
        Ne,data = follower of Ne,data in SET2
    End while

--- are simply removed from the algorithm. It is exactly these lines, that cause selection of 2×SF2 instead of 2×SF4, if both selections are possible at this stage, because both 2×SF2 and 2×SF4 require both two E-DPDCH i.e. two spreading factors or two code channels. Therefore the requirement "follower of Ne,data requires no additional E-DPDCH" is true and the follower i.e. 2×SF2 (or 2×N2) is selected. This is a first possible embodiment.

As a side note it should be mentioned that also the sorting of the SET2 is unnecessary in the algorithm then as well and Ne,data,j can be computed directly without using the intermediate variable Ne,data.

There are some limitations of the previous embodiment. In particular, while removing the while loop has the desired effect, it also has an undesirable side effect: Not only is now 2×SF4 preferred over 2×SF2, but also now SF8 is preferred over SF4. While similarly as above, SF8 has better performance than SF4, the difference becomes more and more marginal with increasing spreading factor. However, when SF8 is used, much more puncturing is necessary in order to fit into the smaller number of available bits N8 instead of N4. Higher puncturing unfortunately causes a poorer coding performance which will offset the marginal advantage of SF8 over SF4. Note that the performance degradation due to inter symbol and inter code interference going from 2×SF4 to 2×SF2 is more pronounced, therefore in that case it is advantageous to use the higher puncturing.

Therefore, even further optimizations can be done as will be shown in the following embodiment:

In this embodiment we use the spreading factor as a second selection criterion 14 (FIG. 1) to avoid selection of 2×SF2 over 2×SF4 and at the same time still retain the selection of SF4 over SF8. More generally expressed, it will prefer lower spreading factors, unless the spreading factor is already below a certain limit and otherwise prefer higher spreading factors. We achieve this embodiment, by modifying the while statement as follows:

> While Ne,data–Ne,j is negative and Ne,data not max of SET2 and follower of Ne,data requires no additional E-DPDCH and follower of Ne,data requires a spreading factor higher than SFt do SFt can be preset (or signaled as other parameters). It is a threshold spreading factor, from which on lower spreading factors are avoided, i.e. if SFt is set to SF2, then SF2 will not be preferred over SF4 (but SF4 will be preferred over SF8).

This second embodiment avoids the disadvantage of the first embodiment, while retaining its advantage.

The objective of the second embodiment for the specific case discussed here can further be reached with the following third embodiment. We achieve this embodiment, by modifying the while statement as follows:

> While Ne,data–Ne,j is negative and Ne,data not max of SET2 and follower of Ne,data requires only a single E-DPDCH do It can be observed, that the follower of Ne,data requires only a single E-DPDCH, if the follower is within the set {N256, N128, N64, N32, N16, N8, N4}. i.e. not within the set {2×N4, 2×N2, 2×N2+2×N4}. It can be seen that the latter set not only contains the cases where an additional E-DPDCH is required (this is the case for 2×N4, and 2×N2+2×N4) but also the case that SF2 is introduced (this is the case for 2×N2). This means that this simpler evaluation criterion "requires only a single E-DPDCH" sufficiently describes the wanted cases. This criterion is not only simpler to evaluate than the criterion "Ne,data requires no additional E-DPDCH and follower of Ne,data requires a spreading factor higher than SFt" of the first embodiment, but also the criterion of the related art "follower of Ne,data requires no additional E-DPDCH".

With the third embodiment no comparison between follower and predecessor has to be done, but only the follower needs to be examined, that's simpler than for the related art. The second embodiment uses a condition which contains the condition of the related art combined with a further condition and is therefore more complex than the related art and consequently also more complex than the third embodiment.

We conclude that the third embodiment achieves the objective with minimal complexity and also by only applying a small change to the related art. Small changes are obviously to be preferred over larger changes, because the latter always bear the risk of introducing errors into an implementation.

A further embodiment and simplification of the comparison done with the inner while loop is to substitute the "While" statement by an if statement and the appendant "End while" by a simple "End if" statement. This is applicable to all the embodiments described where the "While" loop is not completely removed.

A further simplification would be to set Ne,data,j=min SET2 as already described in the algorithm above and if the number of E-DPDCH is one for max SET2 then set Ne,data, j=max SET2 and to remove the while loop:

> While Ne,data – Ne,j is negative and Ne,data not max of SET2 and follower of Ne,data requires no additional E-DPDCH do
> Ne,data = follower of Ne,data in SET2
> End while That results in:

```
SET1 = { Ne,data in SET0 such that Ne,data – Ne,j is non negative }
If SET1 not empty and SET1 smallest element needs just one
    E-DPDCH then Ne,data,j = min SET1
Else
    SET2 = { Ne,data in SET0 such that Ne,data – PL__non__max × Ne,j
    non negative }
    If SET2 is not empty then
    Sort SET2 in ascending order
        Ne,data,j = min SET2
        If the number of E-DPDCH is one for max SET2
            Ne,data,j = max SET2
        End if
    Else
        Ne,data,j = max SET0 provided that Ne,data,j – PL__max × Ne,j
        non negative
    End if
End if
```

The present invention has been described as the selection process in a transmitting device. However, it will be apparent to those skilled in the art that the receiver must also execute the above determination process in order to find out which parameters the transmitter has used. This is essential because only by applying the same parameters in its reception process the receiver can reconstruct the transmitted data. Consequently the invention is not only applicable to a transmitting device but also a receiving device and the means (computer programs, electronic circuitry or like or different means used for the above mentioned purpose) used in any of these devices.

The system also includes permanent or removable storage, such as magnetic and optical discs, RAM, ROM, etc. on which the process and data structures of the present invention can be stored and distributed. The processes can also be distributed via, for example, downloading over a network such as the Internet. The system can output the results to a display device, printer, readily accessible memory or another computer on a network.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV,* 358 F3d 870, 69 USPQ2d 1865 (Fed. Cir. 2004).

The invention claimed is:

1. A method for selecting a number of code channels and an associated spreading factor for a code division multiple access transmission between a sending device and a receiving device, comprising:

determining a set of permissible parameter pairs with the parameters being a number of code channels and an associated spreading factor according to at least one first selection criterion;

selecting a parameter pair from the set of permissible parameter pairs for the code division multiple access transmission according to at least one second selection criterion; and using at least the spreading factor in the at least one second selection criterion, with a higher value spreading factor being preferred over a lower value spreading factor when both the higher and lower value spreading factors in the set of permissible parameter pairs are not higher than a threshold spreading factor value, and the lower value spreading factor being preferred over the higher value spreading factor when both the higher and lower value spreading factors in the set of permissible parameter pairs are not less than the threshold spreading factor value.

2. The method according to claim 1, further comprising using at least the number of code channels in a second selection criterion with a value of one being preferred over any higher value.

3. The method according to claim 2, wherein the at least one first selection criterion is given by a limitation of the sending device or the receiving device, a rate matching criterion or a limit for the amount of puncturing.

4. A telecommunication device, comprising:

means for determining a set of permissible parameter pairs with the parameters being a number of code channels and an associated spreading factor according to at least one first selection criterion;

means for selecting a parameter pair from the set of permissible parameter pairs for the code division multiple access transmission according to at least one second selection criterion; and using at least the spreading factor in the at least one second selection criterion, with a higher value spreading factor being preferred over a lower value spreading factor when both the higher and lower value spreading factors in the set of permissible parameter pairs are not higher than a threshold spreading factor value, and the lower value spreading factor being preferred over the higher value spreading factor when both the higher and lower value spreading factors in the set of permissible parameter pairs are not less than the threshold spreading factor value;

means for using at least the spreading factor in the at least one second selection criterion with a higher value spreading factor being preferred over a lower value spreading factor when both the higher and lower value spreading factors in the set of permissible parameter pairs are not higher than a threshold spreading factor value, and the lower value spreading factor being preferred over the higher value spreading factor when both the higher and lower value spreading factors in the set of permissible parameter pairs are not less than the threshold spreading factor value.

5. The telecommunication device according to claim 4, wherein the telecommunication device is a transmission device or a reception device.

6. The telecommunication device according to claim 5, wherein the telecommunication device is a base station or a mobile terminal.

* * * * *